Figure 1:
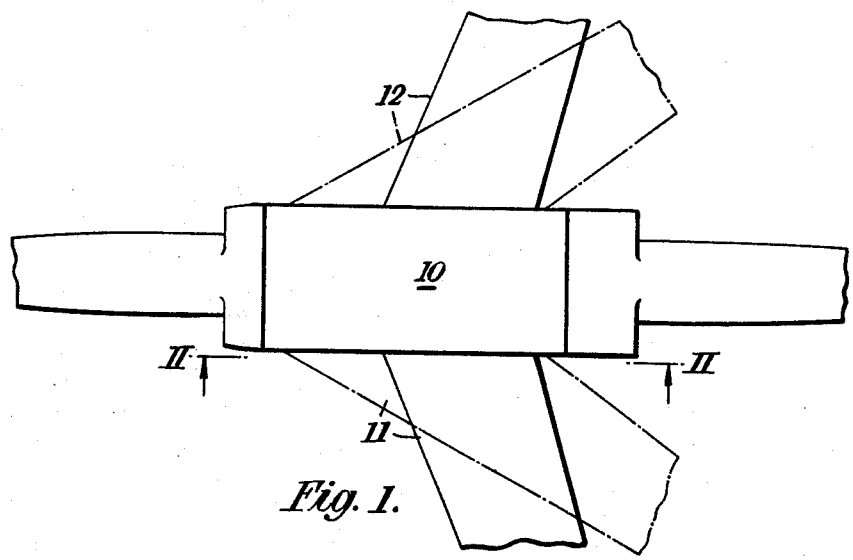

March 30, 1965  C. F. TOMS  3,175,791
FUSELAGE CLOSURE FOR VARIABLE SWEEP AIRCRAFT
Filed April 14, 1964  3 Sheets-Sheet 1

Inventor
Charles Frederick Toms
By Nolte & Nolte
Attorneys

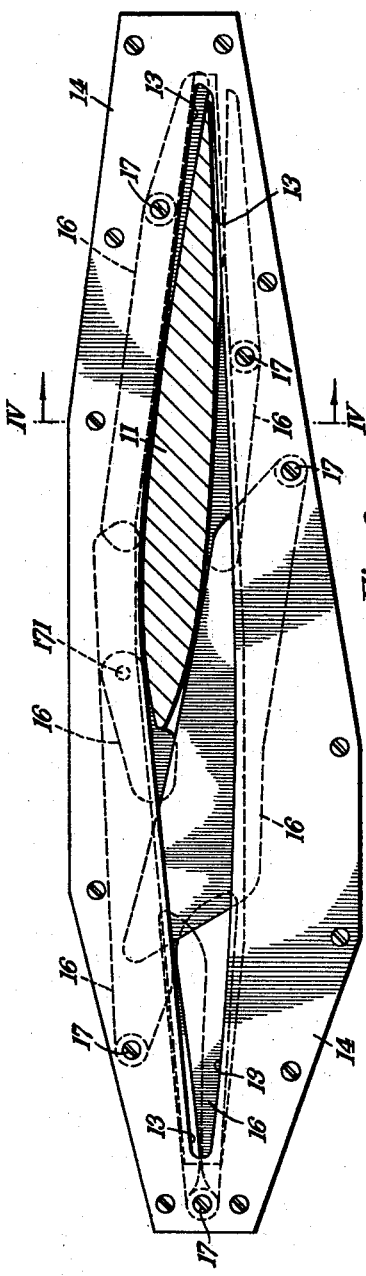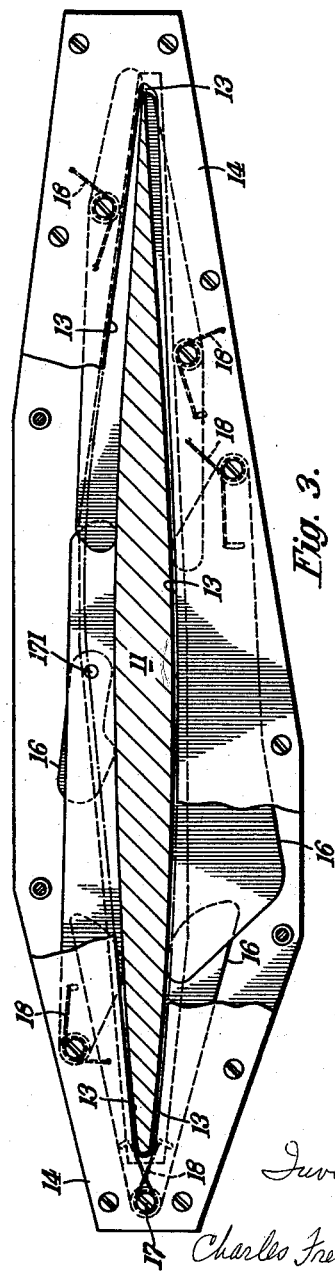

March 30, 1965 C. F. TOMS 3,175,791
FUSELAGE CLOSURE FOR VARIABLE SWEEP AIRCRAFT
Filed April 14, 1964 3 Sheets-Sheet 3
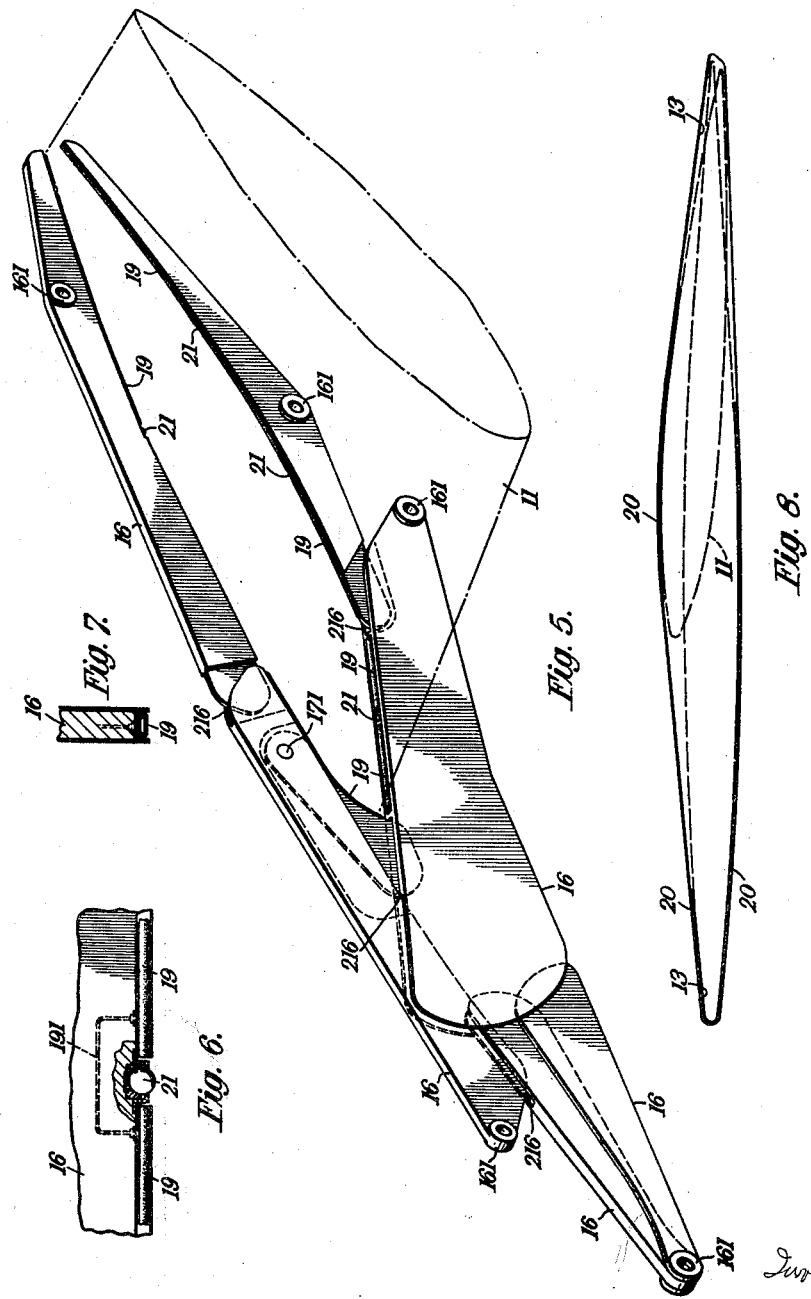

… … …

United States Patent Office 3,175,791
Patented Mar. 30, 1965

3,175,791
FUSELAGE CLOSURE FOR VARIABLE
SWEEP AIRCRAFT
Charles Frederick Toms, Totternhow, near Dunstable, England, assignor to British Aircraft Corporation (Operating) Limited, London, England, a British company
Filed Apr. 14, 1964, Ser. No. 359,752
Claims priority, application Great Britain, Apr. 16, 1963, 14,922
9 Claims. (Cl. 244—130)

The invention is concerned with the problem of providing means for temporarily closing gaps which occur at the points at which fixed structural parts of aircraft are intersected by moving components, organs of control, trimmers or the like. An example of the need for such provision is found in an aeroplane in which the wings are capable of being moved in relation to the body between an outspread position appropriate to take-off and landing maneuvers and flight at subsonic speeds, and a swept-aft position suitable for flight at supersonic speed, wherein the profile of the wing root portions where they are intersected by the side of the body varies in shape and dimensions during the movements of the wings relative to the body between said positions, due to a change in the chord or incidence of the intersected portion, to a change of the dihedral angle of the wing, or otherwise. It will be understood that by reason of such variation of profile, the aperture in the body side which is required to accommodate all relevant profiles, is only partially closed with the wing in any one position, so that gaps occur about the wing roots at said apertures in different wing-sweep conditions.

Other instances in which a similar problem arises are found where fin and tailplane surfaces intersect a fuselage, or where tailplane surfaces intersect the walls of the junction fairings used in certain empennage assemblies or where movable leading-edge and/or trailing-edge flaps or the like on a wing intersect the wall of a fixed structure.

The invention has for its object to provide means whereby the gaps occurring in circumstances such as those hereinbefore referred to may be closed to form an effective weatherproof joint between the parts, and for this purpose it is proposed to mount in the wall of the fixed structure, in juxtaposition to the aperture therein through which the moving component extends, at least one set of lamellae having capability of movement relatively to each other and to the structure, with one or more edges of each lamella bearing yieldably against the surface of the component as the latter moves in relation ot the structure, said lamellae extending shutter-wise across gaps in said aperture which may exist at any position of the moving component relative to the structure.

The lamellae may take the form of thin plates which are nested in side-by-side relationship in channel-like housing or pockets fashioned in the wall of the fixed structure, and are arranged to slide over each other at their adjacent edges in the manner of the elements of an iris. Alternatively, the adjacent edges of the plates may fit one within another in tongue-and-groove fashion, the depths of the grooves being sufficient to receive the tongued edges of the adjacent plates up to the limits of their relative sliding movement. The plates may be hinged to the fixed structure or to each other, and each plate will have at least one portion of its edge shaped so that for a given position of the moving component relative to the fixed structure the plate will conform closely to the surface of the component in the plane of intersection.

There may be two sets of lamellae for each moving component, one set being arranged to co-operate with the upper surface thereof, and the other set with the lower surface thereof. The movements of the lamellae in their housings or pockets and in relation to each other are preferably brought about by their bearing contact with the moving component as it changes its position in the aperture, such bearing contact being maintained automatically by means of springs and/or by the weight of the lamellae.

For simplicity of construction of the lamellae and the arrangements for housing them, the wall of the fixed structure through which the moving components project will be made as nearly planar as possible, though the invention is not to be regarded as limited to aircraft fulfilling this condition, it being understood that the gap-closing lamellae, and the housings in which they are mounted, may be shaped as part of any surface having at least one axis about which the surface is a surface of revolution such as cylindrical, conical or spherical. Where, therefore, in the present description said gap-closing members are referred to as being of "lamellar" form it is intended that non-planar configurations such as those here mentioned shall be comprehended within that expression.

Figure 4:
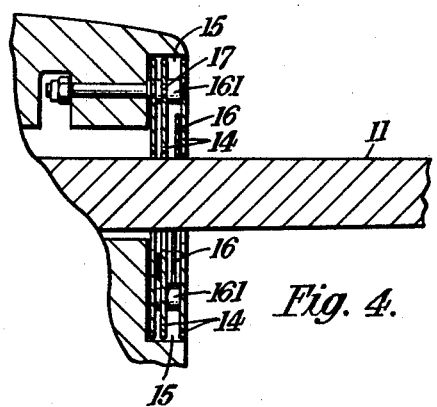

The manner in which the invention may be carried into effect is hereinafter described with reference to the accompanying drawings, in which FIG. 1 is a diagrammatic plan of part of an aeroplane such as that described in my co-pending patent application No. 316,654, having wings mounted pivotally on the body for adjustable sweeping movement between an outspread low-speed position indicated in full lines and a swept-aft high-speed position indicated in chain-dotted lines. This figure illustrates the difference in the chordal section of the wing at the point where it intersects the side of the body, which occurs on such sweeping movement. FIG. 2 is a section taken on the line II—II of FIG. 1 (though drawn to a larger scale), showing the wing in the low-speed position, and FIG. 3 is a similar view to FIG. 2 but showing the wing in the high-speed position. FIG. 4 is a section on the line IV—IV of FIG. 2. FIG. 5 is a perspective view of an assembly of gap-closing plates similar to those illustrated in FIGS. 2 to 4, in which pneumatic sealing means and certain anti-friction bearings are provided. FIG. 6 is a large-scale detail showing part of the sealing arrangement in side elevation, and FIG. 7 is a cross-section thereof. FIG. 8 is a side elevation of the body aperture, showing the portions of the periphery thereof which are provided with seals which contact the wing surface when the wing is in certain positions.

In FIG. 1 the reference numeral 10 designates the body of the aircraft and the numerals 11 and 12 the port and starboard wings thereof. The side-wall of the body is provided with an aperture 13 of a size sufficient to accommodate the relative wing in all positions of sweep, having regard to any changes of the chord or incidence of the part of the wing root which is intersected by the side-wall of the fuselage, and/or to any changes of wing dihedral angle, which may accompany adjustments in sweep angle. The fuselage wall in the regions surrounding said aperture incorporates a structure 14 which contains deep channel-like pockets 15 in which are received a plurailty of the gap-closing shutter plates 16 provided in accordance with the invention. It is contemplated that at least two such plates may be provided for each of the wing root surfaces, although in the embodiment illustrated in the drawings as many as five of the plates 16 may be required to provide adequate closure of the gaps in relation to each wing surface.

Each shutter plate 16 may consist of a single plate of any suitable material of, say 16 S.W.G. (or may be a composite sandwich of considerably greater thickness, e.g. one inch). At suitable points in each plate is provided an apertured lug 161 by which the plate is mounted for pivotal movement about a pivot 17 fixed in the pocket 15 or in an adjacent shutter plate as shown at 171 in FIGS. 2 and 5. The plates 16 are urged outwardly of the pockets (by springs 18 and/or gravity) so that their outer edges rest in contact with the surfaces of the wing root in the plane of intersection, the shapes of such edges being designed so that each plate performs the function of closing a gap between the wing root surface and the boundary of the aperture 13 in the fuselage wall in at least one position of the wing. Some plates may be arranged so as to be constantly in contact with the wing root surface; others may come into operation only in certain given positions of the wing. In certain cases the plates 16 may fit one within another in tongue-and-groove fashion, as can be seen in FIG. 5 at 216.

The depths of the pockets 15 and the extent to which the plates 16 are "immersed" therein is preferably such as to afford to the plates a high degree of lateral stability and resistance to flexure or displacement normal to the fuselage side wall when adjustments of the wing take place. In certain wing positions a plate may extend into pockets both above and below the wing root, as in the case of the plate 116 in FIG. 2. As the wing moves in relation to the fuselage, the bearing contact of the plates upon the surfaces of the wing root in the instantaneous plane of intersection as the plates ride over the varying profile causes the plates to accommodate themselves by their sliding movement in or out of their pockets and relatively to each other, so that at all times the gaps in the aperture which would otherwise occur are substantially closed.

Small interstices which might exist at the edges of the plates 16 may be sealed by the provision along the same of resilient cushions or lips. For example, each plate may have a length of flexible tubing 19 attached along its edge, such tubing, the width of which preferably does not exceed the thickness of the plate, being inflated automatically when the wing comes to rest in a selected position.

Seals 20 similar to those provided for the plates may be employed on parts of the body side-wall aperture, where in certain wing sweep positions the wing profile follows the profile of said body side-wall aperture and the seal-equipped edge of the plate at those points has retired completely inside its channel housing (FIG. 8). In this figure the portions of the aperture 13 which are provided with seals are shown by the cross-hatching.

The freedom of movement between the plates and the wing root surfaces may be enhanced by providing small captive balls 21 or rollers in the edges of the plates 16 FIGS. 5 and 6), which will roll across the said surfaces during wing movements, and the arrangement may be such that the cushions 19 on the edges of the plates only bear upon the wing root surfaces when inflated as aforesaid. Discontinuous cushions 19 may be connected by ducts 191 as shown in FIG. 6.

If desired, the movement of the plates in a direction parallel to the wing surface may be prevented by means of spring-loaded plungers which are incorporated in the plates and are arranged to co-operate with holes or sockets in the wing surfaces in certain selected wing sweep settings.

What I claim as my invention and desire to secure by Letters Patent is:

1. Closure means comprising, a fixed structure having a wall formed with an aperture, a moving component extending into said aperture, having a cross section smaller than said aperture, and being movable in said aperture with respect to said fixed structure, at least one set of lamellae, means mounting said lamellae for movement relative to each other and to said structure, with at least one edge of each lamella bearing against a surface of the component and arranged to follow said surface as the component moves in relation to the structure, said lamellae extending shutter-wise across gaps in said aperture which may exist between the moving component and the structure.

2. Closure means as claimed in claim 1, wherein the lamellae are thin plates received in side-by-side nesting relationship in housings or pockets fashioned in the wall of the fixed structure, and arranged to slide over one another at their adjacent edges.

3. Closure means as claimed in claim 1, wherein adjacent lamellae fit one within another in tongue-and-groove fashion.

4. Closure means as claimed in claim 1 wherein the lamellae are hinged to the fixed structure.

5. Closure means as claimed in claim 1, wherein the lamellae are arranged in two sets respectively co-operating with opposite surfaces of the moving component.

6. Closure means as claimed in claim 1, including means for maintaining the edges of operative lamellae in bearing contact with the surfaces of the moving component.

7. Closure means as claimed in claim 1, wherein sealing elements are provided along operative edges of at least some of the lamellae.

8. Closure means as claimed in claim 7, wherein said sealing elements are pneumatic and including means for pressurizing said pneumatic sealing elements.

9. Closure means as claimed in claim 1, including anti-friction devices in the operative edges of lamellae.

References Cited by the Examiner
UNITED STATES PATENTS
3,048,356   8/62   Curtis et al. _____ 244—129

FOREIGN PATENTS
349,879   6/31   Great Britain.
832,181   4/60   Great Britain.

FERGUS S. MIDDLETON, *Primary Examiner.*